US009066123B2

(12) United States Patent
Christopher et al.

(10) Patent No.: US 9,066,123 B2
(45) Date of Patent: *Jun. 23, 2015

(54) SYSTEM FOR MONETIZING RESOURCES ACCESSIBLE TO A MOBILE DEVICE SERVER

(75) Inventors: David A. Christopher, Atlanta, GA (US); Nicholas P. Hill, Atlanta, GA (US); Jeffrey G. Weber, Southlake, TX (US); William A. Brown, Woodstock, GA (US); Troy C. Meuninck, Newnan, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 311 days.

This patent is subject to a terminal disclaimer.

(21) Appl. No.: 12/956,887

(22) Filed: Nov. 30, 2010

(65) Prior Publication Data
US 2012/0137315 A1 May 31, 2012

(51) Int. Cl.
| H04N 7/16 | (2011.01) |
| H04N 21/414 | (2011.01) |
| H04N 21/2543 | (2011.01) |
| H04N 21/258 | (2011.01) |
| H04N 21/6334 | (2011.01) |

(52) U.S. Cl.
CPC ..... *H04N 21/41407* (2013.01); *H04N 21/2543* (2013.01); *H04N 21/25875* (2013.01); *H04N 21/63345* (2013.01)

(58) Field of Classification Search
USPC ........................................................ 725/1–8
See application file for complete search history.

(56) References Cited

U.S. PATENT DOCUMENTS

| 5,689,559 A | 11/1997 | Park |
| 5,761,421 A | 6/1998 | Van Hoff |
| 6,167,513 A | 12/2000 | Inoue et al. |
| 6,463,153 B1 | 10/2002 | Sako et al. |
| 6,938,156 B2 | 8/2005 | Wheeler et al. |
| 7,016,951 B1 | 3/2006 | Longworth et al. |
| 7,127,619 B2 | 10/2006 | Unger et al. |

(Continued)

OTHER PUBLICATIONS

Zimmerly, Bill, "A Tiny Cloud in Android", 17 pages article, website last visited Oct. 1, 2010, http://www.ibm.com/developerworks/opensources/library/os-tinycloud/index.html.

(Continued)

*Primary Examiner* — Nasser Goodarzi
*Assistant Examiner* — Kyu Chae
(74) *Attorney, Agent, or Firm* — Guntin & Gust, PLC; Andrew Gust

(57) ABSTRACT

A system that incorporates teachings of the present disclosure may include, for example, a non-transitory computer-readable storage medium operating in a mobile device server. The non-transitory computer-readable storage medium can include computer instructions to execute a web server application in the mobile device server. The web server application can be operable cause the mobile device server to detect a media resource center while roaming in a communication zone of the media resource center, transmit a pairing key to the media resource center, and receive from the media resource center authorization to pair with one or more resources selected by the media resource center according to the pairing key. In one embodiment a billing system can be operable to determine whether to apply a monetary charge to a subscriber account based on the pairing key. Other embodiments are disclosed.

23 Claims, 9 Drawing Sheets

(56) References Cited

U.S. PATENT DOCUMENTS

| | | | |
|---|---|---|---|
| 7,194,438 B2 | 3/2007 | Sovio et al. | |
| 7,391,866 B2 | 6/2008 | Fukami et al. | |
| 7,412,727 B2 | 8/2008 | Kim | |
| 7,430,753 B2 | 9/2008 | Gray | |
| 7,492,899 B2 | 2/2009 | Qiao | |
| 7,634,076 B2 | 12/2009 | Lee | |
| 7,720,986 B2 | 5/2010 | Savoor | |
| 7,756,130 B1 | 7/2010 | Lee | |
| 7,761,531 B2 | 7/2010 | Johnson et al. | |
| 8,015,253 B1 | 9/2011 | Zapata et al. | |
| 8,108,916 B2 | 1/2012 | Fink et al. | |
| 8,116,808 B2 | 2/2012 | Amine | |
| 8,130,738 B2 | 3/2012 | Chan et al. | |
| 8,169,958 B2 | 5/2012 | Torres et al. | |
| 8,332,905 B2 | 12/2012 | Jenkin et al. | |
| 8,392,947 B2 | 3/2013 | Grannan et al. | |
| 8,443,420 B2* | 5/2013 | Brown et al. | 726/3 |
| 2002/0157002 A1 | 10/2002 | Messerges et al. | |
| 2002/0184301 A1 | 12/2002 | Parent | |
| 2003/0026423 A1 | 2/2003 | Unger et al. | |
| 2003/0051041 A1 | 3/2003 | Kalavade et al. | |
| 2003/0095664 A1 | 5/2003 | Asano et al. | |
| 2003/0190024 A1 | 10/2003 | Ju | |
| 2004/0133794 A1 | 7/2004 | Kocher et al. | |
| 2004/0240668 A1 | 12/2004 | Bonan et al. | |
| 2004/0253923 A1 | 12/2004 | Braley | |
| 2005/0010637 A1 | 1/2005 | Dempski et al. | |
| 2005/0044223 A1* | 2/2005 | Meyerson | 709/225 |
| 2005/0125819 A1 | 6/2005 | Ono et al. | |
| 2005/0138192 A1 | 6/2005 | Encarnacion et al. | |
| 2005/0177515 A1* | 8/2005 | Kalavade et al. | 705/52 |
| 2005/0235329 A1 | 10/2005 | Karaoguz et al. | |
| 2005/0251821 A1 | 11/2005 | Pina | |
| 2006/0009247 A1 | 1/2006 | Kelley et al. | |
| 2006/0046714 A1 | 3/2006 | Kalavade | |
| 2006/0098593 A1 | 5/2006 | Edvardsen et al. | |
| 2006/0123099 A1 | 6/2006 | Paila | |
| 2006/0150251 A1 | 7/2006 | Takashima et al. | |
| 2006/0172700 A1 | 8/2006 | Wu | |
| 2006/0193456 A1 | 8/2006 | Light et al. | |
| 2006/0209773 A1* | 9/2006 | Hundal et al. | 370/338 |
| 2006/0220838 A1 | 10/2006 | Wakim et al. | |
| 2006/0262913 A1 | 11/2006 | Cook et al. | |
| 2006/0271968 A1 | 11/2006 | Zellner | |
| 2007/0019670 A1* | 1/2007 | Falardeau | 370/465 |
| 2007/0022469 A1* | 1/2007 | Cooper et al. | 726/3 |
| 2007/0055783 A1 | 3/2007 | Gourraud | |
| 2007/0097860 A1 | 5/2007 | Rys | |
| 2007/0140448 A1 | 6/2007 | Lin et al. | |
| 2007/0142036 A1 | 6/2007 | Wikman et al. | |
| 2007/0157281 A1 | 7/2007 | Ellis | |
| 2007/0180111 A1 | 8/2007 | Chmaytelli et al. | |
| 2007/0263853 A1 | 11/2007 | Pearson et al. | |
| 2008/0074258 A1 | 3/2008 | Bennett et al. | |
| 2008/0195406 A1 | 8/2008 | Matsumoto | |
| 2008/0320534 A1 | 12/2008 | Wang et al. | |
| 2009/0019492 A1 | 1/2009 | Grasset | |
| 2009/0031360 A1 | 1/2009 | Kidd et al. | |
| 2009/0063193 A1 | 3/2009 | Barton et al. | |
| 2009/0088197 A1 | 4/2009 | Stewart | |
| 2009/0089183 A1 | 4/2009 | Afram et al. | |
| 2009/0093237 A1* | 4/2009 | Levenshteyn et al. | 455/412.1 |
| 2009/0106366 A1 | 4/2009 | Virtanen et al. | |
| 2009/0171985 A1 | 7/2009 | Tischer | |
| 2009/0193486 A1 | 7/2009 | Patel et al. | |
| 2009/0282098 A1 | 11/2009 | Karaoguz | |
| 2009/0288122 A1 | 11/2009 | Zellner | |
| 2009/0298514 A1 | 12/2009 | Ullah | |
| 2009/0327702 A1 | 12/2009 | Schnell | |
| 2009/0328118 A1 | 12/2009 | Ravishankar | |
| 2009/0328228 A1 | 12/2009 | Schnell | |
| 2010/0031298 A1 | 2/2010 | Iwanami et al. | |
| 2010/0031366 A1 | 2/2010 | Knight et al. | |
| 2010/0052853 A1 | 3/2010 | Hilton | |
| 2010/0058398 A1 | 3/2010 | Ojala et al. | |
| 2010/0071021 A1 | 3/2010 | Friedman | |
| 2010/0076274 A1 | 3/2010 | Severson | |
| 2010/0194335 A1 | 8/2010 | Kirby et al. | |
| 2010/0197238 A1 | 8/2010 | Pathuri et al. | |
| 2010/0275249 A1 | 10/2010 | McCann et al. | |
| 2010/0328547 A1 | 12/2010 | Mayorga | |
| 2011/0022522 A1* | 1/2011 | Sege | 705/75 |
| 2011/0130118 A1* | 6/2011 | Fan et al. | 455/411 |
| 2011/0197264 A1 | 8/2011 | McDade | |
| 2011/0258437 A1 | 10/2011 | McKelvey | |
| 2012/0081209 A1 | 4/2012 | Brown et al. | |
| 2012/0084834 A1* | 4/2012 | Brown et al. | 726/3 |

OTHER PUBLICATIONS

Davies, C., "i-Jetty Turns Android Cellphone Into Mobile Webserver", pp. 1-6, http://www.phonemag.com/i-jetty-turnsandroid-cellphone-into-mobile-webserver-031762. . . , posted Mar. 17, 2008, website last visited Oct. 1, 2010.

Linux, Devices, "iNTEL 'Personal Server' Research: Mobile Computing in the Palm of your Hand", pp. 1-4, http://www.linuxfordevices.com/c/a/Linux-For-Devices-Articles/Intel-Personal-Server-res . . . , website last visited Oct. 1, 2010.

Toorani,et al., "LPKI—A Lightweight Public Key Infrastructure for the Mobile Environments", pp. 162-166, IEEE 2008, ICCS 2008.

Wikipedia, "Mobile Web Server (Symbian OS)", 1 page, http://en.wikipedia.org/wiki/Mobile_Web_Server_(Symbian_Os), website last visited Oct. 1, 2010.

Wikipedia, "Mobile Web Server", pp. 1-3, website last visited Oct. 1, 2010.

Opensource, "MWS: Rationale—A Website on a Mobile Computing in the Palm of your Hand", pp. 1-4, http://wiki.opensource.nokia.com/projects/MWS:Rationale, website last visited Oct. 1, 2010.

Lin, et al., "On Controlling Digital TV Set-Top-Box by Mobile Devices via IP Network", pp. 1-8, Proceedings of the Seventh IEEE International Symposium on Multimedia (ISM '05), Computer Society, 2005.

Soroko, Jonathan, "Web Server on Your Cellphone—a New Design Space", pp. 1-4, Popular Logistics, Feb. 16, 2010.

Rendon, et al., "Architecture for Web Services Access from Mobile Devices", Web Congress, LA-WEB 2005, Third Latin American, 2005.

* cited by examiner

600

700

SYSTEM FOR MONETIZING RESOURCES ACCESSIBLE TO A MOBILE DEVICE SERVER

FIELD OF THE DISCLOSURE

The present disclosure relates generally to device communication and monetization techniques.

BACKGROUND

Media communication systems such as interactive television systems can deliver media content to media processors such as set-top boxes. Generally, media content can be broadcast by these systems and delivered according to the type of services that users have subscribed to. In interactive media communication systems, users can also request services on demand. Portable media devices such as mobile phones (e.g., Apple's iPhone™) or media players (e.g., Apple's iPod™) can be adapted to communicate with media processors over a wireless medium. The combined services of portable and fixed media devices can provide users with a rich environment for utilizing multimedia services.

DETAILED DESCRIPTION

Figure 1:
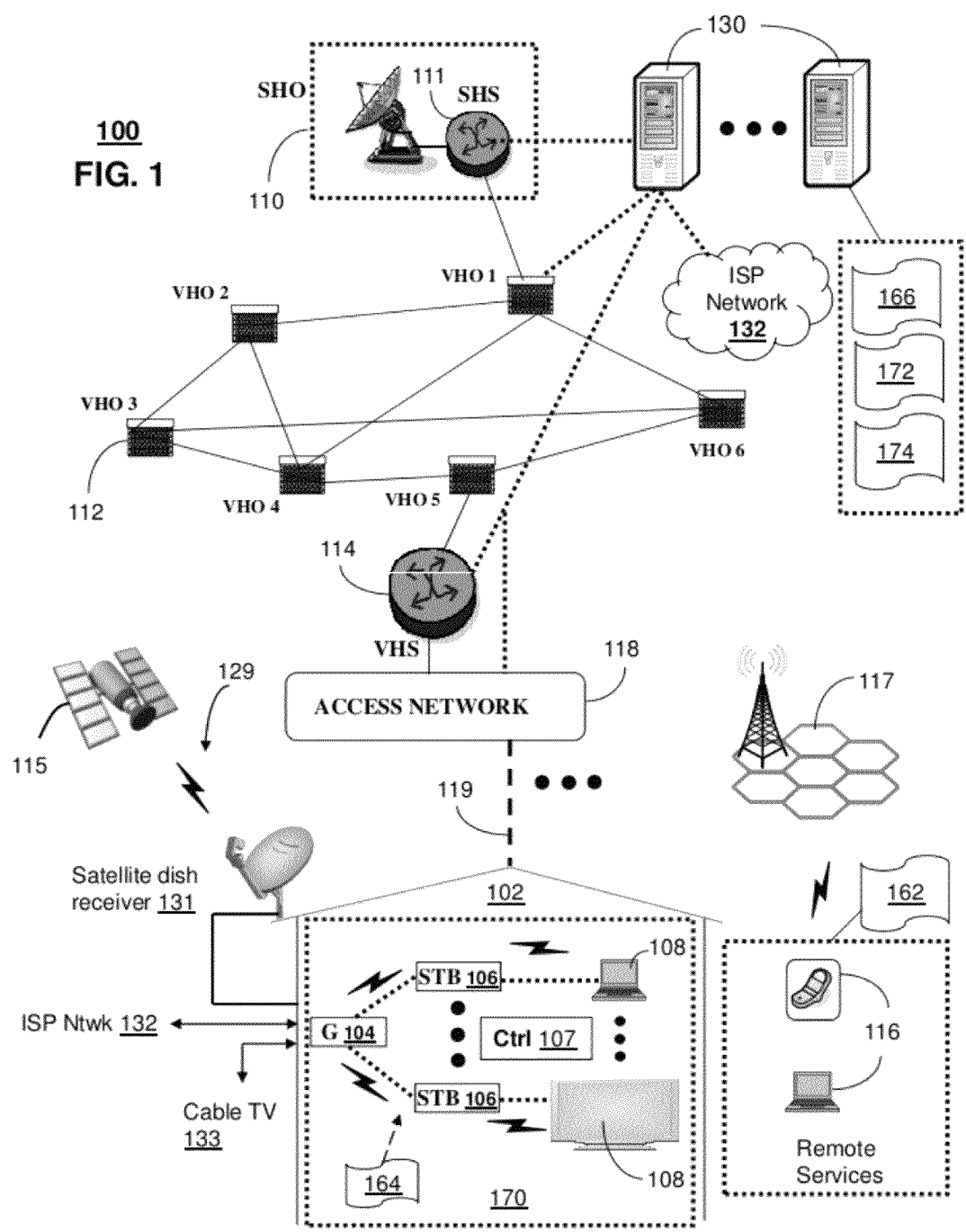
FIGS. 1-2 depict illustrative embodiments of communication systems that provide media services.

The present disclosure describes, among other things, illustrative embodiments of a mobile device server for establishing communications and exchanging messages with a media resource center that manages resources capable of supplying media content of various forms to the mobile device server. The mobile device server can include a web server application operating therein to enable utilization of media resources of the media resource center. In one illustrative embodiment, a first monetization model can be applied to a subscriber account for software applications and/or media content made available to the web server application operating in the mobile device server. In another illustrative embodiment, a second monetization model can be applied to the subscriber account for media resources made available to the mobile device server. Other embodiments are contemplated by the present disclosure as described below.

One embodiment of the present disclosure can include a portable communication device having a processor adapted to receive from a remote server a pairing key that identifies a monetization model. The processor can be further operable to execute a web server application in the portable communication device. The web server application can be adapted to cause the device to detect a media resource center when entering a communication zone of the media resource center. The web server application can be further adapted to establish communications with the media resource center, and to transmit the pairing key to the media resource center to enable processing of a software application. A monetary charge can be applied to a subscriber account according to the monetization model.

One embodiment of the present disclosure includes a non-transitory computer-readable storage medium operating in a mobile device server. The non-transitory computer-readable storage medium can include computer instructions to execute a web server application in the mobile device server. The web server application can be operable to cause the mobile device server to detect a media resource center when entering a communication zone of the media resource center. The web server application can be further operable to transmit a pairing key to the media resource center, and to receive authorization from the media resource center to pair with one or more resources selected by the media resource center according to the pairing key. In one embodiment, a billing system can be operable to determine whether to apply a monetary charge to a subscriber account based on the pairing key.

One embodiment of the present disclosure includes a resource control manager having a processor operable to manage a plurality of resources communicatively coupled to the resource control manager and to receive an identifier from a web server application operating in a mobile device server. The processor can be further operable to identify a service grade from the identifier and to select one or more resources from the plurality of resources according to the service grade. A billing system can be operable to determine whether to apply a monetary charge to a subscriber account according to the service grade or the identifier.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a multicast communication protocol.

The VHS 114 can distribute multimedia broadcast content via an access network 118 to commercial and/or residential buildings 102 that house a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline, or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the media system of FIG. 1. The satellite broadcast television system 129 can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can also be coupled to one or more non-portable computing devices 130, a portion of which can operate as a web server for providing portal services over an Internet Service Provider (ISP) network 132 to wireline media devices 108 or wireless communication devices 116.

Multiple forms of media services can be offered to media devices over landline technologies such as those described above. Additionally, media services can be offered to media devices by way of a wireless access base station 117 operating according to wireless access protocols such as Wireless Fidelity (WiFi), or cellular communication technologies such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

System 100 can also provide for all or a portion of the computing devices 130 to function as a remote server (herein referred to as server 130). The server 130 can use computing and software technology 166 to perform the function of processing requests initiated by a web server application 162 operating in portable communication devices, such as those shown in reference 108 or 116 (herein referred to as mobile device servers). Server 130 can also be used to control operations of a resource control manager 164 which can operate from the residential gateway 104, the media processor 106 or other computing devices in building 102 for managing resources of a media resource center 170. Another aspect of the server 130 can be a content provider system 172 which can be used for distributing media content to the communication devices of FIG. 1.

It is further contemplated by the present disclosure that the server 130 can also represent a billing system 174 for billing a subscriber account when applications are requested by the mobile device servers and/or for billing the subscriber account when resources of the media resource center are requested by mobile device servers. The content provider system 172 and the billing system 174 can be managed by a service provider of the media communication system 100 of FIG. 1, or by third party entities.

Illustrative embodiments of methods that can operate in portions of the aforementioned devices and systems of FIG. 1 are described below.

Figure 2:
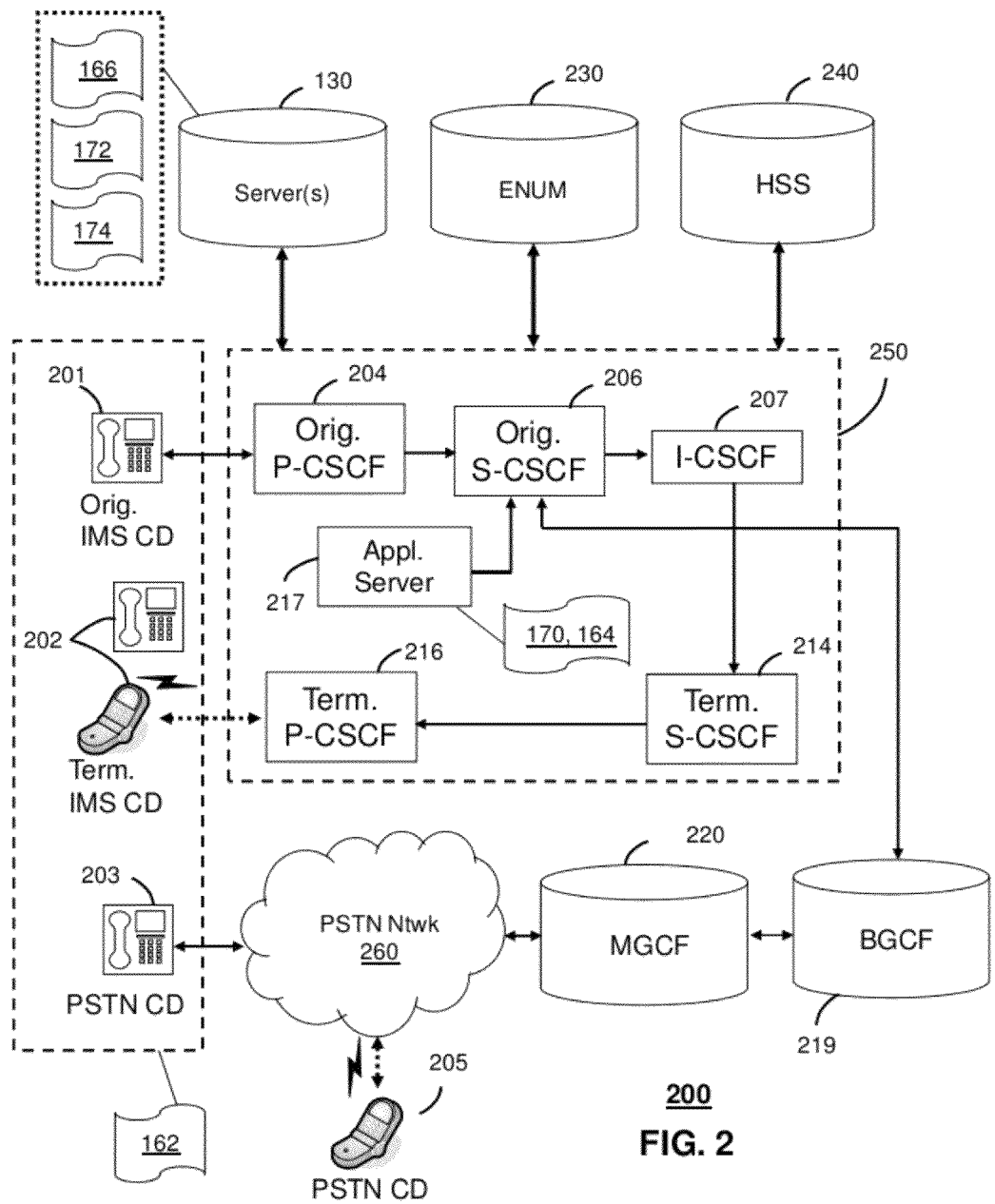

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. A communication session involving at least one PSTN CD utilizes the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish Voice over Internet Protocol (VoIP) communication services, thereby enabling the calling and called parties to engage in voice and/or data communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice communications.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 with the multimedia and Internet services of communication system 100.

It is further appreciated that the CDs of FIG. 2 can operate as wireline or wireless devices. Although not shown, the CDs of FIG. 2 can be communicatively coupled to a cellular base station, a femtocell, a WiFi router, a DECT base unit, or another suitable wireless access unit to establish communications with the IMS network 250 of FIG. 2. Accordingly, multiple wireline and wireless communication technologies are contemplated for the CDs of FIG. 2.

System 200 can include or otherwise be coupled with computing devices 130 of FIG. 1 for purposes similar to those described above. Computing devices 130 can function as a remote server 166, content provider system 172, and billing system 174. It is further contemplated by the present disclosure that a web server application 162 can operate from any of the communication devices (e.g., references 201, 202, 203, and 205) depicted in FIG. 2. It is also contemplated that these devices can communicate with a resource control manager 164 operating from, for example, the AS 217, to gain access to resources of the media resource center 170. Illustrative embodiments of methods that can operate in portions of the devices of FIG. 2 are described below.

Figure 3:
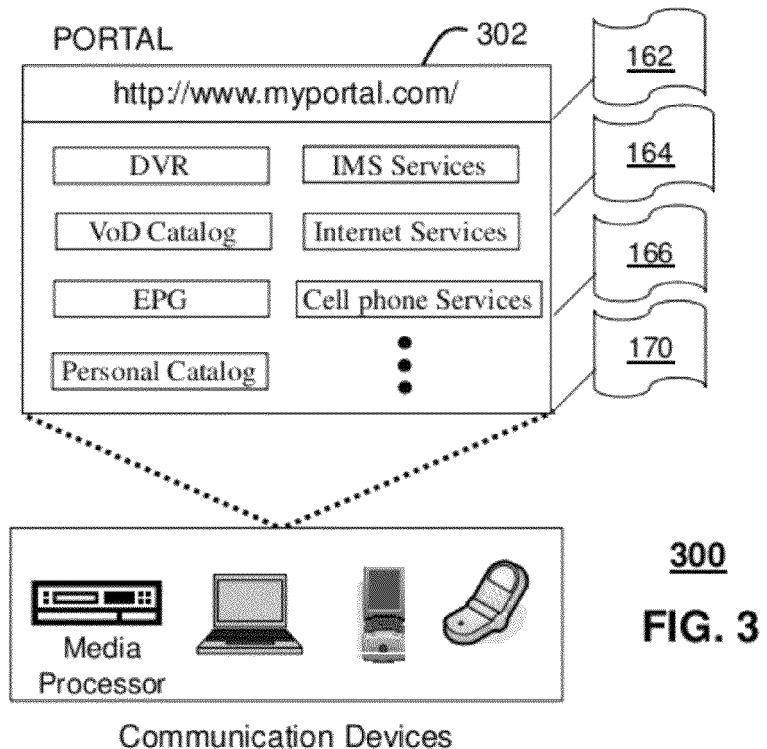
FIG. 3 depicts an illustrative embodiment of a portal that can interact with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with a Internet browser such as Microsoft's Internet Explorer™, Mozilla's Firefox™, Apple's Safari™, or Google's Chrome™ using an Internet-capable communication device such as those described for FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162, 164, 166, and 170 of a mobile device server, a resource control manager, a remote server, and a media resource center, respectively, as described earlier. Illustrative embodiments of methods that can operate in portions of the web portal 302 of FIG. 3 are described below.

Figure 4:
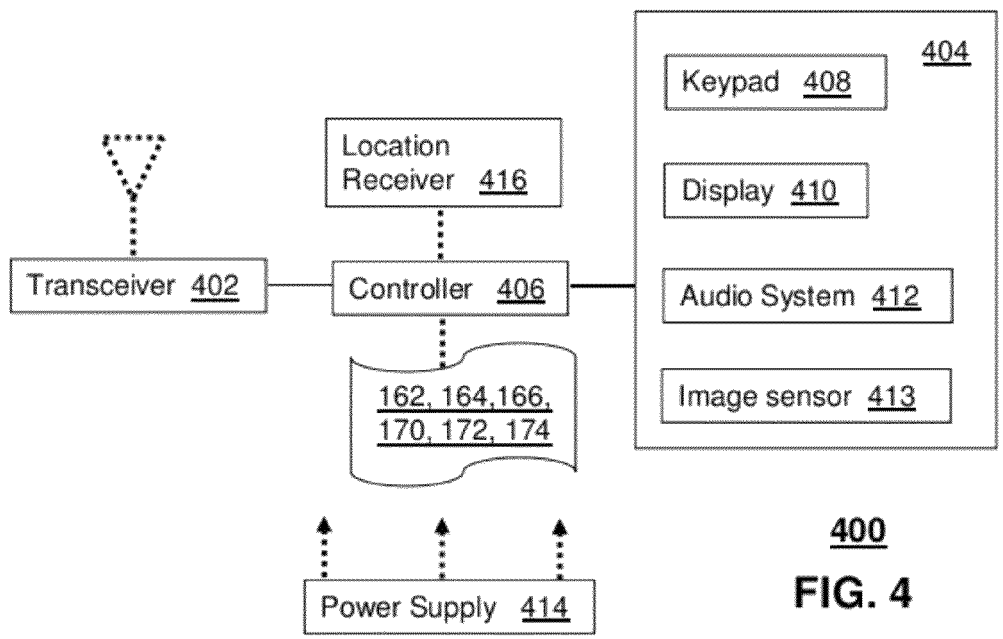
FIG. 4 depicts an illustrative embodiment of a communication device that can be utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying information to an end user of the communication device 400. In an embodiment where the display 410 is touch-sensitive, a portion or all of the keypad 408 can be presented by way of the display 410 with its navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize power management technologies such as replaceable and rechargeable batteries, supply regulation technologies, and charging system technologies for supplying energy to the components of the communication device 400 to facilitate long-range or short-range portable applications. The location receiver 416 can utilize location technology such as a global positioning system (GPS) receiver capable of assisted GPS for identifying a location of the communication device 400 based on signals generated by a constellation of GPS satellites, thereby facilitating location services such as navigation.

The communication device 400 can use the transceiver 402 to also determine a proximity to a cellular, WiFi, Bluetooth or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as a media resource center, a resource control manager, a mobile device server, a remote server, a content provider system, or a billing system as described earlier. The controller 406 can be adapted in various embodiments to perform the functions 162, 164, 166, 170, 172, and 174 of the mobile device server, resource control manager, remote server, media resource center, content provider system, and billing system, respectively. Illustrative embodiments of methods that can operate in portions of the communication device 400 of FIG. 4 are described below.

Figure 5:
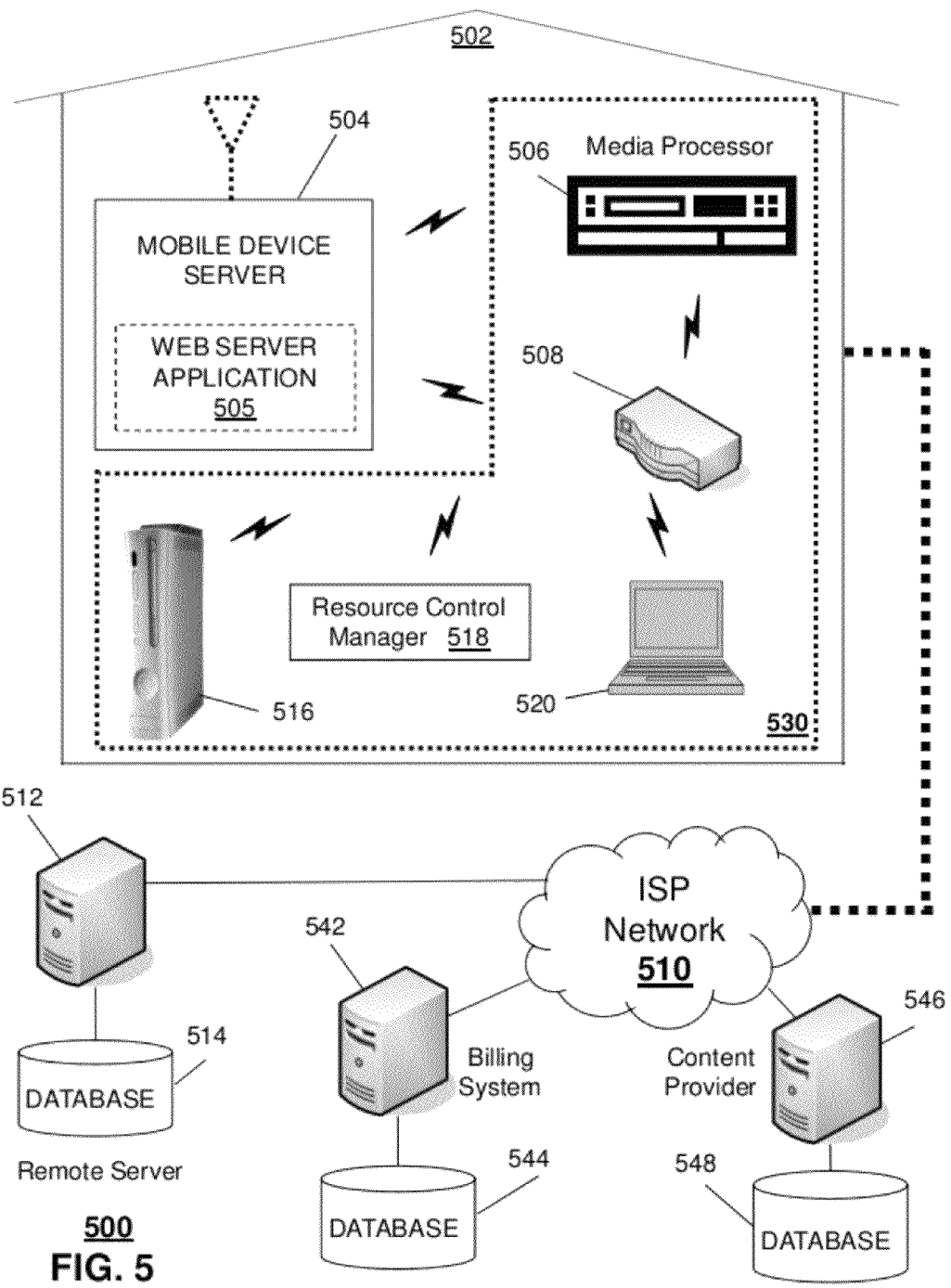
FIG. 5 depicts an illustrative embodiment of a system with computing and media resources.

FIG. 5 depicts an illustrative embodiment of a system 500 that can operate according to methods 600-900 described in FIGS. 6-9. System 500 can comprise a mobile device server 504 that can enter in a building 502 (residence or commercial establishment). The mobile device server 504 can represent a portable telephone such as a cellular telephone, a cordless telephone, a portable computer, or a portable gaming device comprising in whole or in part the components of the communication device 400 shown in FIG. 4. The mobile device server 504 can be a portable telephony device which is capable of executing a web server application 505. Other embodiments of the mobile device server 504 such as a Personal Digital Assistant (PDA), a smart phone, or a tablet (e.g., an iPAD™) adapted to execute a web server application 505 are contemplated by the present disclosure. For illustration purposes, the present disclosure will make references to the components shown in FIG. 4 when discussing the operations of the mobile device server 504.

A web server application 505 can represent a hypertext transfer protocol (HTTP) web server application 505 implemented in software, hardware or combinations thereof operating from the controller 406 of the mobile device server 504. A web server application 505 can also be represented by a web server application used by a server or hosting computer system. Accordingly, multiple types of web server applications 505 operational in the mobile device server 504 are contemplated by the present disclosure.

System 500 can further include a media processor 506 and a gateway 508 that can provide wireless communication services to the media processor 506 and other devices in the building 502 such as a computing device 520, a gaming console 516, and a resource control manager 518. The resources in building 502 can collectively represent a media resource center 530. The resource control manager 518 can be a standalone computing device as shown in FIG. 5. In another embodiment, the resource control manager 518 can be an integral part of the gateway 508. In yet another illustrative embodiment, the functions of the resource control manager 518 can be distributed among several devices such as the gateway 508 and computing device 520. The resource control manager 518 can be utilized to manage usage of media and computing resources of the media resource center 530 by the mobile device server 504.

System 500 can also comprise an ISP network 510 that provides private and/or public Internet services to building 502. By way of the Internet Service Provider (ISP) network 510, the resource control manager 518 can communicate with a remote server 512 for purposes of managing resources made available to the mobile device server 504 as will be described below. A database 514 can be communicatively coupled to the remote server 512 to provide resource management services to one or more resource control managers 518 operating from a plurality buildings (only building 502 is shown in FIG. 5). The resource control manager 518 can be operable to access, by way of the ISP network 510, a billing system 542 communicatively coupled to a database 544. The billing system 542 can be utilized for applying charges to a subscriber account associated with the mobile device server 504. The billing system 542 can be managed by a service provider of the media communication systems 100-300 of FIGS. 1-3, or a third party having a commercial arrangement with the service provider of systems 100-300.

The mobile device server 504 can also be operable to access the ISP network 510 by way of gateway 508 or by way of a long-range wireless communication system such as a cellular or WiMAX communication system. The mobile device server 504 is operable to access the content provider system 546 to request content stored in database 548 in the form of software applications and/or media content that can be downloaded to the mobile device server 504 for presentation at the mobile device server 504 or by way of one or more of the media resources of the media resource center 530. When a software application and/or media content is downloaded to the mobile device server 504, a charge can be applied to a subscriber account.

FIGS. 6-9 depict illustrative embodiments of methods 600-900 that can be applied to the operations of portions of the systems and devices of FIGS. 1-5.

Method 600 depicts an illustrative embodiment for subscribing to media services and for programming a mobile device server 504 with an identifier (such as a pairing key described below) that identifies the subscribed services. Method 600 can begin with step 602 in which a consumer subscribes to one or more services of a media service provider. The media service provider can offer consumers interactive media and communication services such as shown in FIGS. 1-2, interactive portal services such as shown in FIG. 3, and combinations thereof. Services offered by the service provider can include without limitation interactive TV (iTV) services, cellular phone services, Internet services, landline voice communication services, portal services, as well as other next generation media services.

A service provider can offer consumers grades of these services, which an agent of the service provider can record in step 604 in a subscriber-created account. For example a service provider can offer a plurality of grades of iTV services (e.g., basic channels, upgrade to sports channels, upgrade to premium movie channels, etc.). The service provider can also offer grades of services for cellular phone services (e.g., nationwide coverage, minute grades, data services, computer tethering services, etc.). Internet services can also be graded by speed, reliability, service and support (business vs. consumer grade), and so on. Landline voice services can also be graded by call plans such as nationwide call plans, local call plans, international call plans, etc. Portal services can also be graded according to the capability of the web portal to access resources of the consumer, the ability to view media content as streamed data, the ability to share media content with friends and family, and so on.

Collectively, all grades of service can be identified by a single grade of service identifier (ID), or as a string of service grade IDs each identifying the grade of service of each service offered to a subscriber. Hence forth, the term service grade can represent a single service grade that collectively describes a family of service grades, or it can represent a sequence of service grades each describing a respective service.

Figure 6:
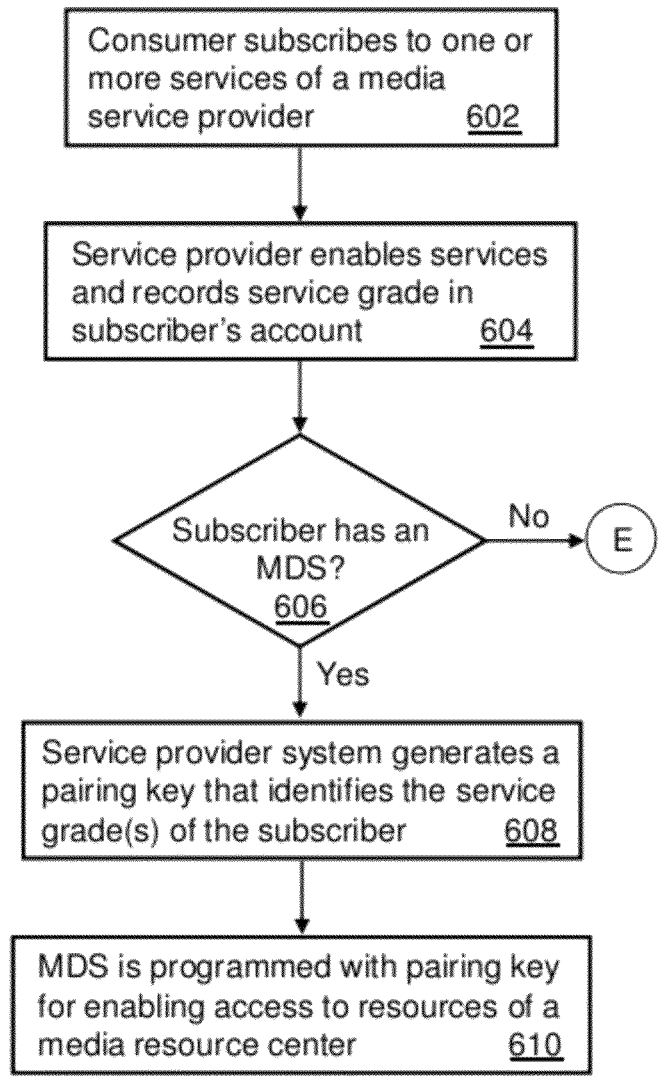
FIGS. 6-9 depict illustrative embodiments of methods operating in portions of the systems and components of FIGS. 1-5.

Referring back to step 606 of FIG. 6, if a service provider system (such as one of the computing devices 130 of FIG. 1) detects that the subscriber has a mobile device server 504, or a mobile device server 504 is offered to and accepted by the subscriber, the service provider system can proceed to step 608 where it generates a pairing key which can be used to identify the service grade(s) of the subscriber. The pairing key can be encrypted with proprietary technology, or can utilize public key infrastructure (PKI) technology. Alternatively, or in combination, the pairing key can comprise a personal identification number (PIN), user name and password, or other forms of secure verification technology. The pairing key can be programmed in the mobile device server 504 at step 610. The programming step can occur while the mobile device server 504 is provisioned at a retail store of the service provider, over the air as by way of a cellular network, or over an Internet-capable wireline interface. For security purposes, the pairing key can be stored in a tamper-proof memory device such as a Subscriber Identity Module, commonly referred to as a SIM card. If portability of the pairing key is undesirable, the pairing key can be stored in a tamper-proof memory device integrated in the mobile device server 504. Other tamper-proof storage techniques can be used.

Method 700 depicts an illustrative embodiment for acquiring software applications and/or content offered by a content provider system 546 (shown in FIG. 5) by way of a mobile device server 504. The content provider managing the content provider system 546 and the service provider managing the service provider system referred to in method 600 can be the same entity, or can be an independent third party who has a commercial affiliation with the service provider of the systems in FIGS. 1-3.

Method 700 can begin with step 702 in which the content provider system 546 presents an assortment of applications/content to a mobile device server 504 by way of, for example, an Internet browser operating from the mobile device server 504. A user of the mobile device server 504 can browse through software applications as well as media content and make one or more selections by way of the UI 404 of the mobile device server 404. Software applications in the present context can mean executable software that can operate under the control of the web server application 505 operating in the mobile device server 504. The executable software can represent any type of software that can perform functions of interest to the user of the mobile device server 504. For example, a software application can represent client software that can be used to control the media processor 506, or the gaming console 516 in building 502. Media content can represent audio content, visual content, or combinations thereof. When a selection is made in step 704, the content provider system 546 can be adapted to extract the selected software application and/or content from database 548 and download a copy to the mobile device server 504 with a pairing key in step 706 over a wireless or a wireline interface.

The pairing key of method 600 differs from the pairing key of method 700. Specifically, the pairing key referred to in method 700 can be used for authenticating the software application and/or media content, while the pairing key of method 600 can be used for authenticating the user of the mobile device server 504 and/or for defining grade(s) of services that a user of the mobile device server 504 has subscribed to. Both pairing keys can be generated by the service provider of the systems of FIGS. 1-3. The pairing key of method 700 can be utilized by the service provider to prevent unauthorized use of software applications and/or media content with any of the resources (e.g., media processor 506, gaming console 516, etc.) supplied to subscribers of the service provider.

Figure 7:
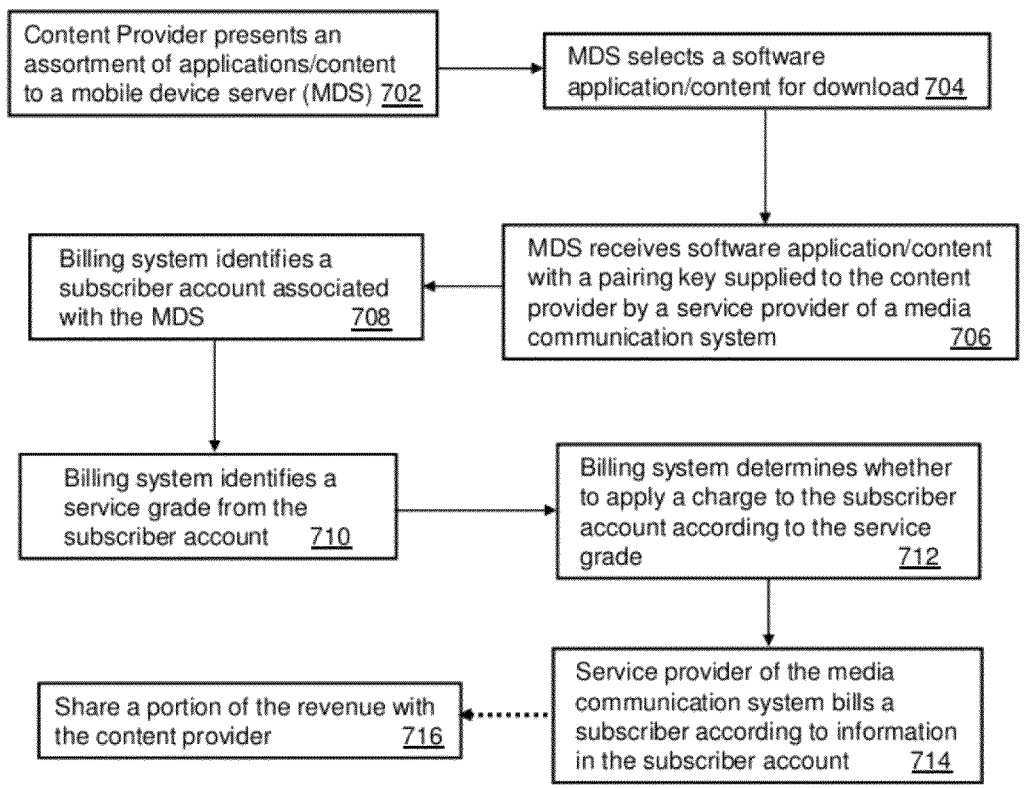
Figure 8:
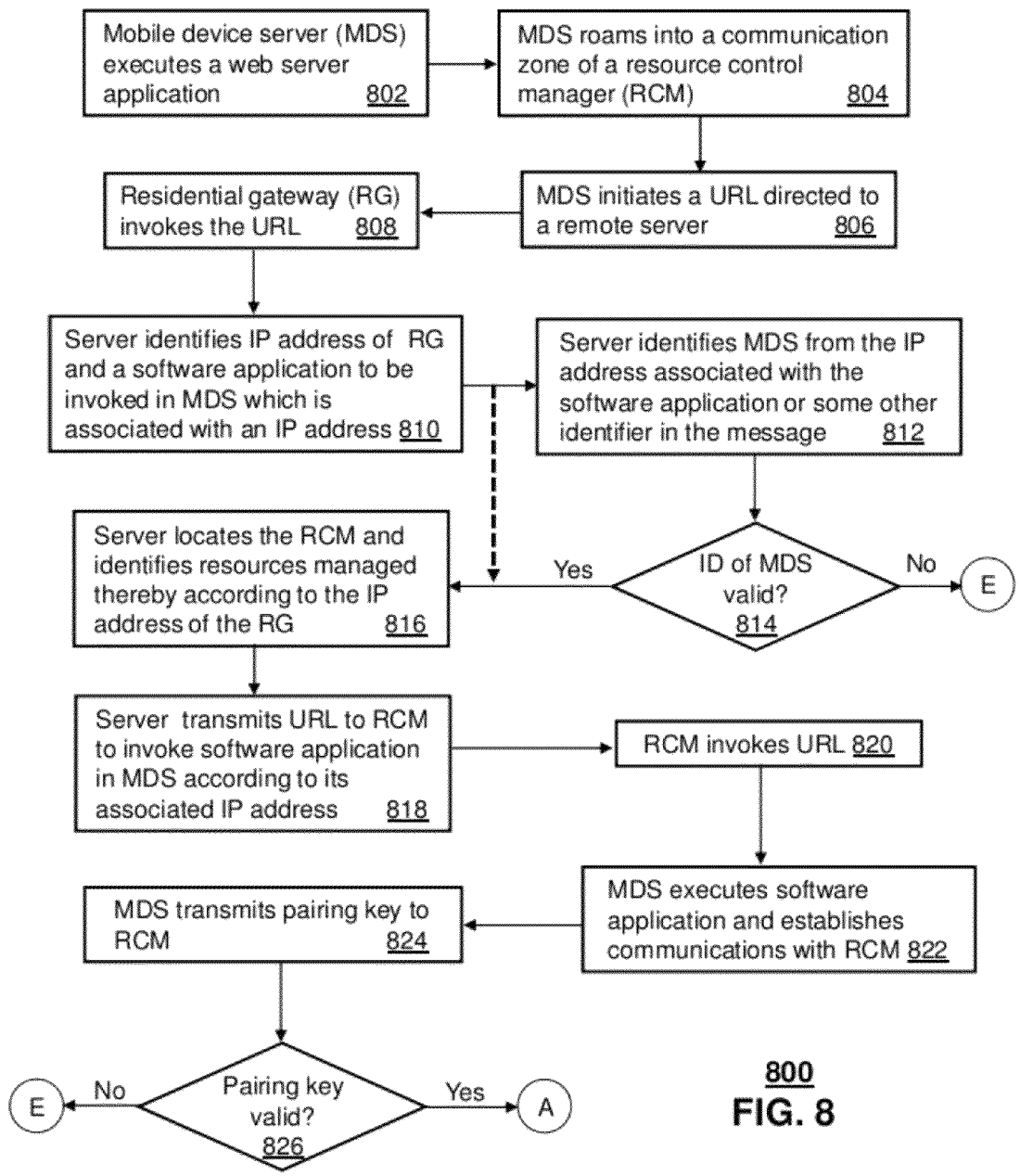
Figure 9:
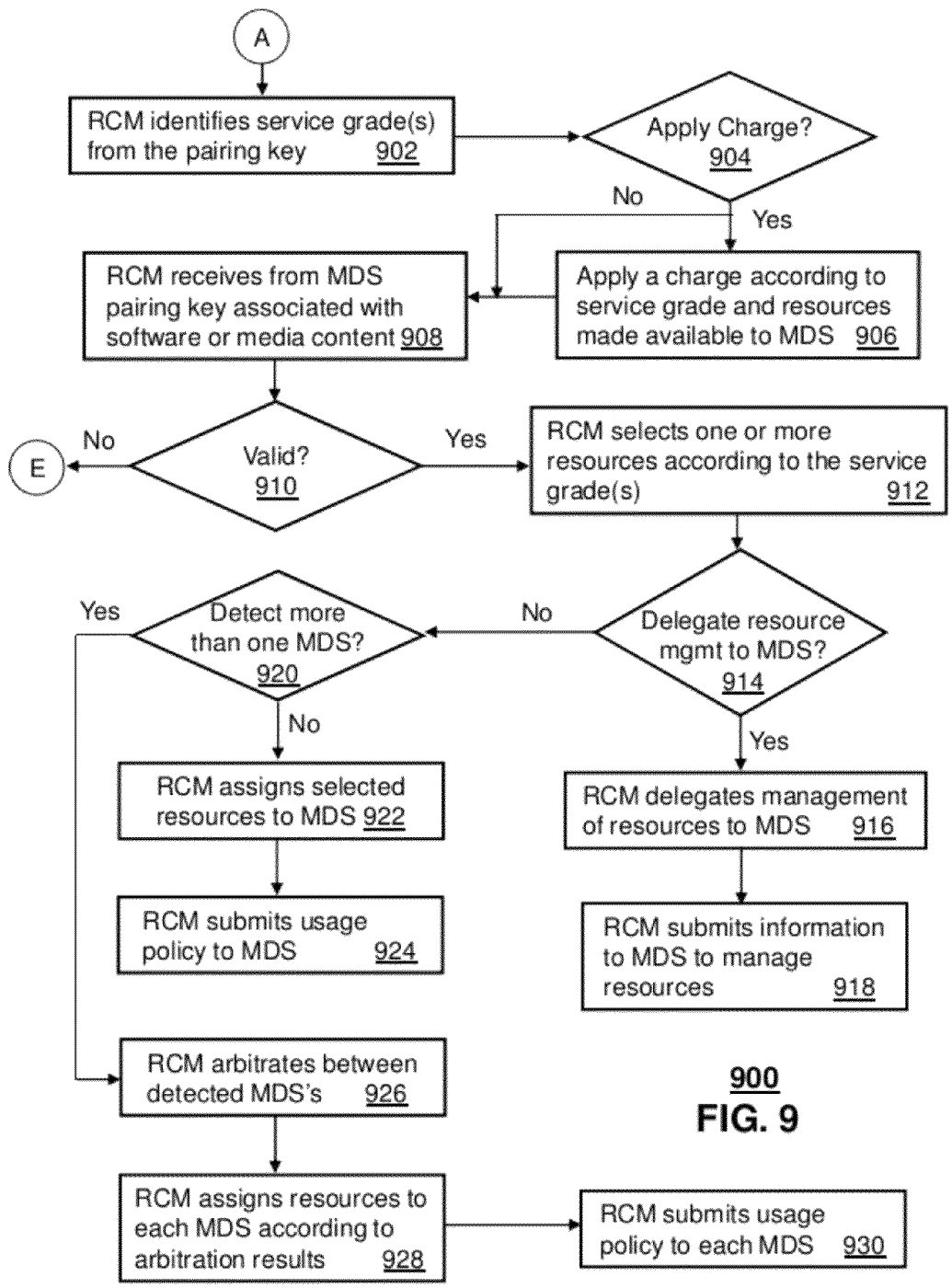

Referring back to the steps of method 700 in FIG. 7, once the software application and/or media content has been downloaded to the mobile device server 504 at step 706, the billing system 542 of FIG. 5 can be adapted to identify at step 708 a subscriber account associated with the mobile device server 504 and identify in step 710 a service grade (or grades) from the information retrieved from the subscriber account. At step 712, the billing system 542 can be further adapted to determine whether to apply a charge to the subscriber account according to the service grade(s). For example, the service provider can offer a service grade in which the subscriber can download unlimited software applications or media content without a charge. A different service grade may allow some types of software applications and/or media content to be downloaded free of charge, while for others the subscriber would be charged a fee. It is contemplated that the service provider of the systems of FIGS. 1-3 can define multiple service grades each with differing fee policies.

If at step 712 the billing system 542 determines from the service grade that a charge is to be applied to the subscriber's account, then the billing system 542 proceeds to step 714 where it applies a charge to the subscriber's account. If the content provider system 546 is managed by a third party having a commercial arrangement with the service provider, then the billing system 542 can also be adapted at step 716 to share a portion of the revenue from the charge applied to the subscriber account with the content provider. If the content provider and the service provider are the same entity, then step 716 can be skipped.

It is contemplated that method 700 can be modified in numerous ways to accomplish the same or similar tasks. For instance, sharing a portion of the charges applied to subscriber accounts with the content provider can be implemented by other systems of FIGS. 1-3. For example, the content provider system 546 can be adapted to apply charges to a subscriber's account which in turn triggers systems of the service provider to submit an electronic payment to the content provider. The electronic payment can represent a portion of revenue from the charged subscriber fees in accordance with a commercial arrangement between the service provider and the content provider. It is further contemplated that in this arrangement the subscriber can be made to believe that the content provider and the service provider are one and the same since the subscriber only sees billing statements from the service provider with no indication that the content provider is a third party having a commercial arrangement with the service provider.

Methods 800-900 depict illustrative embodiments in which a mobile device server 504 acquires access to resources in the media resource center 530 of building 502.

Method 800 begins with step 802 in which the mobile device server 504 of FIG. 5 executes a web server application 505. Step 802 can be initiated by a user manipulating the user interface of the mobile device server 504. Alternatively, the web server application 505 can be automatically initiated by other triggers such as time of day, a user profile, or combinations thereof. The web server application 505 in the mobile device server 504 can be operable to detect in step 804 a resource control manager 518 when roaming into a communication zone of the resource control manager 518. The communication range of the communication zone can be driven by the wireless service and technology characteristics of the gateway 508. Step 804 can represent the web server application 505 of the mobile device server 504 scanning for media resources in building 502 by way of gateway 508 providing access to a wireless network. The gateway 508 can be a WiFi router and modem combination which is communicatively coupled to the ISP network 510 by way of a wired interface such as a coaxial cable or telephone wire interface.

The web server application 505 of the mobile device server 504 can scan for the presence of media resources such as the media processor 506 by requesting information from the resource control manager 518. The resource control manager 518 can transmit to the mobile device server 504 a list of the active devices on the WiFi network. Alternatively, or in combination, the web server application 505 of the mobile device server 504 can transmit a broadcast message on the WiFi network requesting identification from the devices communicatively coupled to the WiFi network. Other identification techniques are contemplated by the present disclosure.

Once the resource control manager 518 has been discovered, the web server application 505 can present the detected media resource(s) to a user over the UI 404 of the mobile device server 504. The user can manipulate the UI 404 as previously described to indicate a desire to establish communications with the resource control manager 518. Alternatively, or in combination, a need to establish communications with the resource control manager 518 can be detected from a prior history of user interactions, a profile established by the user of the mobile device server 504 indicating a preference for establishing communications with the resource control manager 518, or other triggers that may be definable by user behavior or user-established settings.

In step 806, the web server application 505 in the mobile device server 504 can initiate a URL directed to the remote server 512 by way of the gateway 508. The following is an illustrative embodiment of a URL that can be initiated by the mobile device server 504: http://someServer.com/launchApp?special_app=http://<IP address of MDS x.x.x.x>/mrml.xml. The URL can include a domain name of the remote server 512 and instructions to launch a specific software application executable by the web server application 505 in the mobile device server 504. The URL can also include an IP address of the mobile device server 504 which can be used to launch the software application. In step 808, the gateway 508 can attach localization information in the form of header information into an IP header source for network address translation or an HTTP header prior to forwarding the URL to the remote server 512.

The server 512 can receive the URL message by way of the ISP network 510 of FIG. 5. The server 512 can in turn identify in step 810 from the HTTP header the IP address of the gateway 508. The server 512 can also identify from the URL message the software application to be invoked by the mobile device server 504 (e.g., special_app_to_enable_comm_with_resource_ctrl_mgr), and the IP address associated with the software application which can be used to identify the software application and/or the mobile device server 504.

In step 812, the remote server 512 can authenticate the request from the mobile device server 504 using the IP address of the mobile device server 504 or some other identifier added to the URL message (e.g., MAC address of the mobile device server 504). If the server 512 does not recognize the mobile device server 504 in step 814, method 800 can cease. Otherwise, if authentication is successful, the server 512 can proceed to step 816. Authentication of the mobile device server 504 can be delegated to the resource control manager 518, in which case steps 812 and 814 may be bypassed.

At step 816, the server 512 can be operable to locate the resource control manager 518 and media resources managed thereby according to the detected IP address of the gateway 508. The server 512 can locate the resource control manager 518 from a look-up table in a database 514 operating, for example, as a Domain Name Server (DNS), a subscriber database, or combinations thereof. Once the resource control manager 518 and resources managed thereby have been identified, the server 512 can transmit to the resource control manager 518 in step 818 a new URL message to invoke the software application in the mobile device server 504 according to the IP address of the mobile device server 504. The following is an illustrative embodiment of a URL message that can be transmitted to the resource control manager 518: http://<IP address of MDS x.x.x.x>/mrml.xml.

Once the resource control manager 518 invokes this URL in step 820, the web server application 505 in the mobile device server 504 can be operable to execute the software application (special_app_to_enable_comm_with_resource_ctrl_mgr) in step 822 to establish an initial state of communications with the resource control manager 518. Authentication of the mobile device server 504 can take place in steps 824-826 prior to enabling communication services between the mobile device server 504 and resources managed by the resource control manager 518. In step 824, the mobile device server 504 can transmit authentication data to the resource control manager 518. The authentication data can comprise, for example, the pairing key programmed in the mobile device server 504 by the service provider at step 610. As noted earlier, the pairing key can be encrypted data, a PKI key, a PIN, user name and password, or other forms of secure verification technology. The pairing key can be utilized to prevent mobile device servers 504 from utilizing media resources of the communication systems of FIGS. 1-3 unless authorized by the service provider of these systems.

If the authentication data is invalid or not recognized, method 800 ceases at step 826 and may submit an error message to the user of the mobile device server 504 (e.g., "You are not authorized to pair your device with the media resources in this residence"). Otherwise, the resource control manager 518 proceeds to step 902 of FIG. 9 where it identifies service grades from the pairing key. The resource control manager 518 can maintain a database of pairing keys and their corresponding service grade(s) from prior interactions, or can submit a request to a server of one of the communication systems of FIGS. 1-2 or FIG. 5 (such as server 512 or billing system 542) to request an identification of the service grade(s) assigned to the mobile device server 504 according to the supplied pairing key. The service grade(s) can identify the extent of services offered to the mobile device server 504, and the resources that can be made available to the mobile device server 504 in building 502.

Suppose, for example, that a service provider offered three service grades branded as Platinum, Gold and Bronze. Platinum services can, for example, include an offering that combines voice (e.g., VoIP or IMS), television services (e.g., IPTV), gaming services, and high-speed Internet services, and the resources from which they operate (e.g., computer 520, media processor 506, and gaming console 516) which can be made available to the mobile device server 504. Gold services can represent fewer services and resources than those offered in a Platinum plan, but more services and resources than those offered in a Bronze plan. The service provider can offer Platinum services at higher subscription fees than Gold services, while Gold services can be priced lower than Platinum services, but higher than Bronze services. The service provider of the communication systems of FIGS. 1-3 can utilize more complex service schemes by defining subservice levels of a particular service category. For example, Platinum services can have sublevel service grades for the media processor 506 (e.g., premium channels vs. basic channels), the gaming console 516 (e.g., unlimited access to games vs a limited subset of games with the option to purchase others in an on-demand model), and the computing device 520 (e.g., various levels of access to CPU resources, and memory storage). Multiple types of service grades can be defined by the service provider.

Once the service grade(s) have been identified, the resource control manager 518 can supply the pairing key to, for example, the billing system 542 and inform the billing system 542 that the mobile device sever 504 has requested certain resources of the media resource center 530. Based on the resources requested by the mobile device server 504 and the service grades associated with the mobile device server 504 (identifiable by the pairing key), the billing system 542 can be adapted to determine at step 904 whether to apply a charge for providing the mobile device server 504 with access to the requested resources. If the service grade(s) allow for free access to the resources in building 502 then step 906 can be skipped. Otherwise, the billing system 542 can be adapted to apply a charge at step 906 to a subscriber account associated with the mobile device server 504 according to the resources requested by the mobile device server 504.

At step 908, the mobile device server 504 can be adapted to provide the resource manager 518 with the pairing key of the software application and/or media content that the mobile device server 504 wants to utilize in association with the requested resources. For example, the mobile device server 504 may have a software application which may require the use of the gaming console 516 or the media processor 506. Alternatively, or in combination, suppose the mobile device server 504 would like to transfer or process media content (e.g., a movie downloaded from the content provider system 546) at the media processor 506. In both instances, the pairing key supplied to the resource control manager 518 at step 908 can be used to authenticate the software application and/or the media content as being pre-screened and approved by the service provider.

The resource control manager 518 can have a history of pairing keys associated with software and/or content from prior interactions, or can contact the remote server 512 to determine if the pairing key supplied by the mobile device sever 504 is valid. The remote server 512 can have in its database 514 a copy of all the pairing keys supplied to the content provider system 546 in order to validate the use of a software application and/or media content with the media resource center 530 of building 502. If the remote server 512 validates the pairing key at step 910, the resource control manager 518 can proceed to step 912, otherwise it terminates interactions with the mobile device server 504. An error message can then be submitted to the user of the mobile device server 504 (e.g., "You are not authorized to use the software application XXX or media content YYY with the resources in this residence").

If the pairing key is valid, then the resource control manager 518 at step 912 selects one or more resources which can be utilized by the mobile device server 504 according to the service grade(s) assigned thereto. In step 914, the resource control manager 518 can also delegate management of the selected resources to the mobile device server 504 based on the service grade(s). In this embodiment, the mobile device server 504 can be authorized to manage the selected resources without interference by the resource control manager 518. If delegation is appropriate, the resource control manager 518 can inform the mobile device server 504 in step 916 that it is delegating management of the selected resources to the mobile device server 504.

To assist the mobile device server 504, the resource control manager 518 can transmit to the mobile device server 504 in step 918 information associated with delegated resources to assist the mobile device server 504 in managing these resources. The information can include provisioning data, service provider and subscriber usage policies, telemetry data, and other suitable information for managing these resources. Provisioning data can represent an identification of services enabled and available for use by the mobile device server 504. Service provider usage policies can define how these resources can be used by the mobile device server 504 and other devices managed by the mobile device server 504.

For example, a service provider usage policy can identify digital rights management policies, Quality of Service policies, bandwidth management policies, and so on. Subscriber policies can represent subscriber usage preferences such as media content preferences, usage policies (time of day, blocked periods, parental controls, etc.), load management policies, and so on. Subscriber policies can be established through the web portal services described in FIG. 3. For example, a web page can be presented to a subscriber which identifies a list of customizable options to establish a resource management policy to be followed by the resource control manager 518 when enabling or delegating services to a mobile device server 504.

Referring back to step 914, if delegation is not appropriate according to the service grade(s) of the subscriber, the resource control manager 518 can proceed to step 920 where it determines if other mobile device servers 504 are present in the network established by the gateway 508. If only one mobile device server 504 is present, the resource control manager 518 can proceed to step 922 where the resource control manager 518 assigns the selected resources to the mobile device server 504. In step 924, the resource control manager 518 can transmit to the mobile device server 504 a usage policy summarizing the service provider and subscriber usage policies previously described. From this point forward, the mobile device server 504 can begin to utilize the resources assigned in step 922.

Referring back to step 920, if the resource control manager 518 detects that more than one mobile device server 504 is requesting the same resources, the resource control manager 518 can proceed to step 926 where it can arbitrate between the detected mobile device servers 504. The arbitration process can prompt each user of the mobile device servers 504 to make concessions. Alternatively, or contemporaneously, the resource control manager 518 can resolve arbitration on the basis of which of the mobile device servers 504 has the highest service grade (or sublevels of service grades). It is contemplated that any arbitration technique can be applied in step 926. Once arbitration has been completed, the resource control manager 518 can proceed to step 928 where the resource control manager 518 assigns resources to each mobile device server 504 according to the arbitration results. The assignment can represent a distribution of resources with or without sharing of such resources between the mobile device servers 504. For example, some resources might be shared between multiple mobile device servers 504 (e.g., a media processor 506) while others are assigned exclusively to one of the mobile device servers 504 (e.g., gaming console 516). In step 930, the resource control manager 518 can transmit to each mobile device server 504 a usage policy as previously described for the arbitrated resources.

The present disclosure contemplates a mobile device server 504 that among other things can be programmed with a pairing key that can be used to identify grades of services to which a user of the mobile device server 504 has subscribed.

Additional pairing keys can be used to enable a service provider to manage which applications and/or content a mobile device server 504 can be used with the resources of a media resource center 530. The mobile device server 504 can be adapted to detect media resources managed by the resource control manager 518 and can be further adapted to acquire access to all or a portion of such resources according to the illustrative embodiments of methods 800-900 of FIGS. 8-9. By making a web server application 505 portable by way of a mobile device server 504 as described above it may no longer be necessary for media resources to be managed solely by way of infrastructure devices such as those shown in FIGS. 1-3, which are generally not portable. As a result, infrastructure resources can be preserved thereby reducing infrastructure costs.

Upon reviewing the aforementioned embodiments, it would be evident to an artisan with ordinary skill in the art that said embodiments can be modified, reduced, or enhanced without departing from the scope and spirit of the claims described below. For example, methods 800-900 can be adapted so that a mobile device server 504 can communicate with other mobile device servers 504. In this configuration, one of the mobile device servers 504 can function in part as the resource control manager 518 in a master-slave configuration. The mobile device server 504 operating as the resource control manager 518 can assign and/or delegate resources according to the service grade of the requesting mobile device server 504.

In one embodiment, FIG. 5 can be adapted so that the resource control manager 518 is located remotely from building 502. In another embodiment, the resource control manager 518 can be an integral part of remote server 512, or can operate from a computing device that is communicatively coupled to the remote server 512. In another embodiment, the resource control manager 518 can be adapted to offer the mobile device server 504 resources which are remote from a vicinity of building 502. The remote resources can be in one or more other buildings or distributed in the networks of FIGS. 1-3. The remote resources can include without limitation computing resources, storage resources, media processing resources, or other resources which can be made accessible to a mobile device server 504. In yet another embodiment, the resource control manager 518 can be adapted to communicate with other resource control managers 518 located in the networks of FIGS. 1-3 or other residential or commercial buildings remote from building 502. In this embodiment, a resource control manager 518 can request and/or exchange resources with other resource control managers 518 to expand the reach and access of resources made available to mobile device servers 514.

In yet another embodiment, the methods described herein can be adapted to apply a monetary charge to one or more subscriber accounts which may or may not be associated with the mobile device server 504. For example, a user of the mobile device server 504 may have a credit card account. The billing system 542 can be adapted to charge the credit card account of the user when purchasing software or media content as described in method 700 of FIG. 7, and/or when requesting resources of the media resource center 530. In another embodiment, the methods described herein can be adapted so that a monetary charge is applied to a subscriber account of the host or the subscriber of the media resource center 530 when resources of the media resource center 530 are made available to mobile device servers 504 entering the premises 502. Combinations of the aforementioned monetization models are also possible. Accordingly, the present disclosure contemplates multiple monetization models which can be applied by service provider(s) of the systems of FIGS. 1-3 and FIG. 5.

Figure 10:
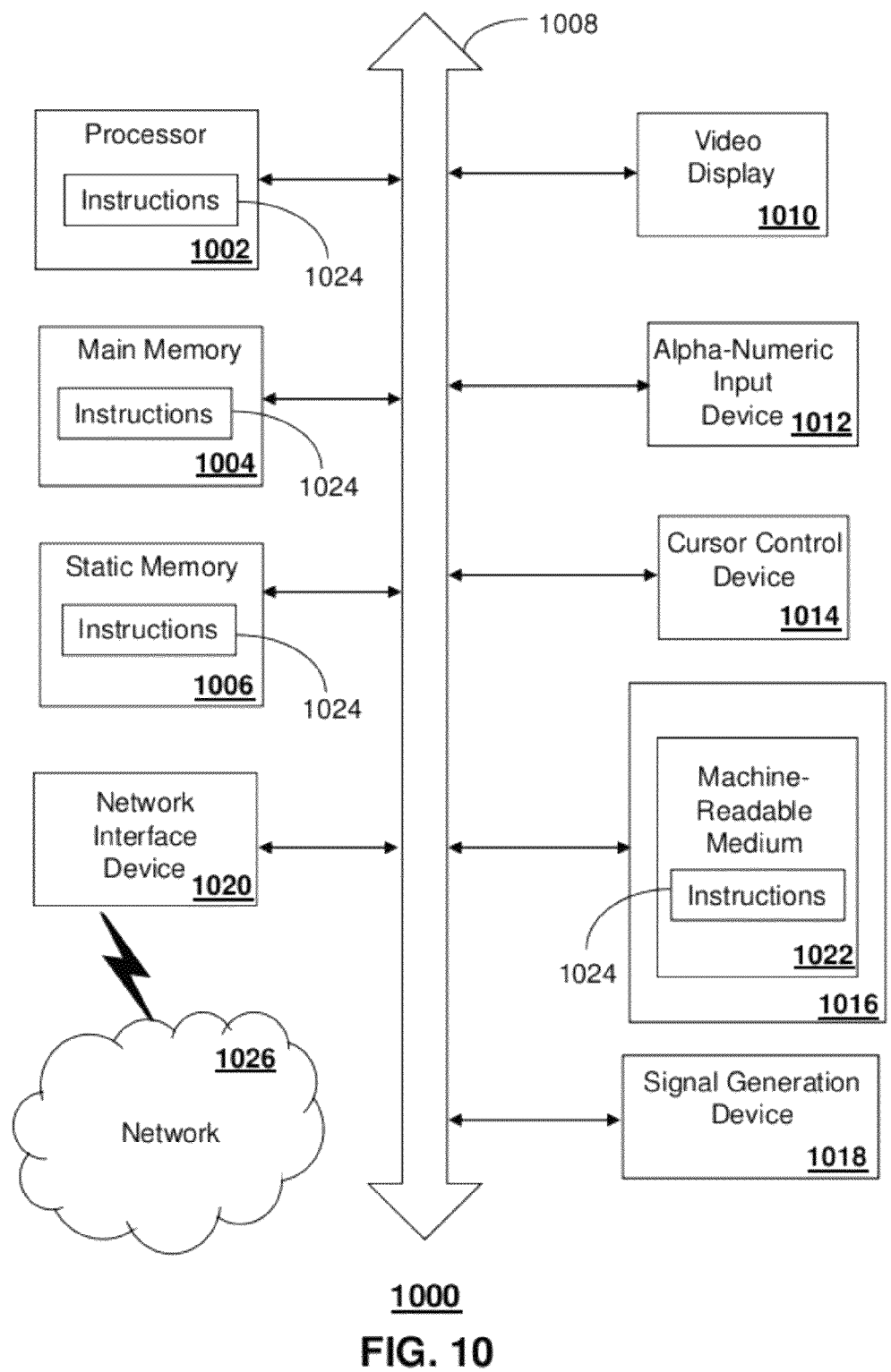
FIG. 10 is a diagrammatic representation of a machine in the form of a computer system within which a set of instructions, when executed, can cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methods discussed above. The machine can operate, for example, as the mobile device server 504, the media processor 506, the gateway 508, the remote server 512, the billing system 542, the content provider system 546, or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device, comprising:
   a memory that stores executable instructions;
   a processor coupled to the memory, wherein the processor, responsive to executing the executable instructions, performs operations comprising:
   receiving from a remote server a pairing key that identifies a monetization model;
   executing a web server application in the portable communication device, wherein the web server application further causes the processor to perform operations comprising:
      transmitting a wireless broadcast message on a wireless network requesting identification of resource devices coupled to the wireless network;
      detecting a resource control manager that is coupled to the wireless network at a media resource center responsive to the transmitting of the wireless broadcast message, wherein the media resource center comprises a plurality of media and computing resources of a building;
      establishing communications with the resource control manager;
      receiving authorization by the resource control manager to pair the portable communication device with the resource control manager;
      transmitting the pairing key to the resource control manager, wherein the resource control manager authenticates the portable communication device according to the pairing key and a database of pairing keys maintained at the resource control manager, wherein the pairing key enables execution of a software application, and wherein a monetary charge is applied to a subscriber account according to the monetization model;
      submitting to the resource control manager at the media resource center a request to delegate management of a resource of the plurality of media and computing resources under control of the media resource center to the portable communication device;
      receiving from the resource control manager an acceptance to the request in response to the resource control manager determining that the pairing key authorizes the portable communication device to manage the resource; and receiving, from the resource control manager, information relating to the resource managed by the resource control manager in order to manage the resource.

2. The portable communication device of claim 1, wherein the web server application further causes the processor to perform operations comprising transmitting to the media resource center the software application for executing the software application at the media resource center.

3. The portable communication device of claim 1, wherein the web server further causes the processor to perform operations comprising:
   executing the software application at the portable communication device; and
   utilizing the resource made available by the media resource center.

4. The portable communication device of claim 1, wherein the web server application further causes the processor to perform operations comprising receiving authorization from the resource control manager to utilize a resource of the plurality of media and computing resources that is selected by the resource control manager according to the pairing key.

5. The portable communication device of claim 4, wherein the plurality of media and computing resources comprise set-top boxes, computing devices, memory storage devices, or gaming consoles.

6. The portable communication device of claim 4, wherein the resource selected by the resource control manager corresponds to a media processor.

7. The portable communication device of claim 1, wherein one of the remote server, the media resource center, or a billing system is operable to apply the monetary charge to the subscriber account, and wherein the subscriber account is associated with the portable communication device.

8. The portable communication device of claim 1, wherein the resource control manager of the media resource center is operable to:
   identify from the pairing key a media service assigned to the portable communication device; and
   apply the monetary charge to the subscriber account according to the media service.

9. The portable communication device of claim 1, wherein the web server application further causes the processor to perform operations comprising:
   transmitting a message to a second remote server by way of a gateway assigned to a first internet protocol address, wherein the message comprises an identifier of the software application received from the remote server, and a second internet protocol address associated with the software application;
   wherein the second server performs operations comprising:
      identifying the media resource center according to the first internet protocol address of the gateway; and
      directing the media resource center to cause the software application to be executed at the portable communication device according to the second internet protocol address.

10. The portable communication device of claim 9, wherein the message transmitted to the second server comprises a uniform resource locator with a plurality of descriptors that identify the software application and the second internet protocol address, and wherein the gateway inserts the first internet protocol address into a hypertext transfer protocol header of the message.

11. The portable communication device of claim 1, wherein the web server application comprises a hypertext transfer protocol server application, and wherein the software application comprises one of a media application, a gaming application, a productivity application, or combinations thereof.

12. The portable communication device of claim 1, wherein communications between the portable communication device and the resource control manager of the media resource center conform to an extensible markup language or a multimedia retrieval markup language.

13. The portable communication device of claim 1, wherein the media resource center is operable to:
   identify a service grade from the pairing key; and
   determine whether to apply the monetary charge according to the service grade.

14. The portable communication device of claim 1, wherein the media resource center performs operations comprising:
   detecting that the portable communication device and a second portable communication device are requesting a common resource managed by the media resource center; and
   arbitrating between the portable communication device and the second portable communication device an assignment of the common resource.

15. The portable communication device of claim 1, wherein the monetary charge is applied according to a service grade.

16. The portable communication device of claim 1, wherein the portable communication device comprises a cellular telephone or a cordless telephone.

17. A non-transitory computer-readable storage medium operating in a mobile device server, the non-transitory computer-readable storage medium comprising instructions which, when executed by a processor, cause the processor to perform operations comprising:
   executing a web server application at the mobile device server, wherein the web server application is operable to cause the processor to further perform operations comprising:
      transmitting a wireless broadcast message on a wireless network requesting identification of resource devices coupled to the wireless network;
      detecting a resource control manager that is coupled to the wireless network at a media resource center according to the wireless broadcast message, wherein the media resource center comprises a plurality of media and computing resources of a building;
      transmitting a pairing key to the resource control manager, wherein the resource control manager authenticates the mobile device server according to the pairing key and a database of pairing keys maintained at the resource control manager;
      receiving authorization from the resource control manager to pair with a resource of the plurality of media and computing resources selected according to the pairing key, wherein a billing system determines whether to apply a monetary charge to a subscriber account based on the pairing key;
      submitting to the resource control manager a request to delegate management of a resource of the plurality of media and computing resources to the mobile device server;
      receiving from the resource control manager an acceptance to the request in response to the resource control manager determining that the pairing key authorizes the management delegation of the resource; and receiving, from the resource control manager, information relating to the resource managed by the resource control manager in order to manage the resource.

18. The non-transitory computer-readable storage medium of claim 17, wherein the billing system is operable to:
determine a service grade from the pairing key; and
determine the monetary charge according to the service grade.

19. The non-transitory computer-readable storage medium of claim 17, comprising instructions to cause the processor to further perform operations comprising:
transmitting a second pairing key to the resource control manager to enable execution of a software application that utilizes the resource selected by the media resource center; and
receiving authorization to execute the software application responsive to the resource control manager validating the second pairing key.

20. The non-transitory computer-readable storage medium of claim 19, comprising computer instructions to cause the processor to further perform operations comprising:
requesting the software application from a content provider system; and
receiving the software application with the second pairing key, wherein the second pairing key is supplied by a service provider that distributes and manages at least a portion of the media resource center.

21. A resource control manager, comprising:
a memory that stores executable instructions; and
a processor coupled to the memory, wherein the processor, responsive to executing the executable instructions, performs operations comprising:
receiving a wireless broadcast message on a wireless network requesting identification of resource devices coupled to the wireless network;
transmitting a response to the wireless broadcast message;
managing a plurality of resources communicatively coupled to the resource control manager;
receiving a pairing key from a web server application operating in a mobile device server;
identifying a service grade from the pairing key;
authenticating the mobile device server according the pairing key and a database of pairing keys maintained at the resource control manager;
transmitting an authorization for the mobile device server to pair with resource control manager;
selecting a resource from the plurality of resources for management by the mobile device server according to the service grade, wherein a billing system determines whether to apply a monetary charge to a subscriber account according to the service grade or the pairing key;
receiving a request to delegate management of the resource of the plurality of resources to the mobile device server;
providing, to the mobile device server, an acceptance to the request in response to the resource control manager determining that the pairing key authorizes the management delegation of the resource; and
providing, to the mobile device server, information relating to the resource managed by the resource control manager in order to enable the management of the resource.

22. The resource control manager of claim 21, wherein the resource control manager comprises a set top box, wherein the mobile device server comprises a cellular telephone, and wherein the web server application comprises a hypertext transfer protocol web server application.

23. The resource control manager of claim 21, wherein the processor further performs operations comprising transmitting the pairing key or the service grade to the billing system to apply the monetary charge.

\* \* \* \* \*